Sept. 24, 1957 J. KURTOVICH 2,807,732
ELECTRIC DRILL WITH BUILT-IN CHUCK KEY
Filed Jan. 4, 1957
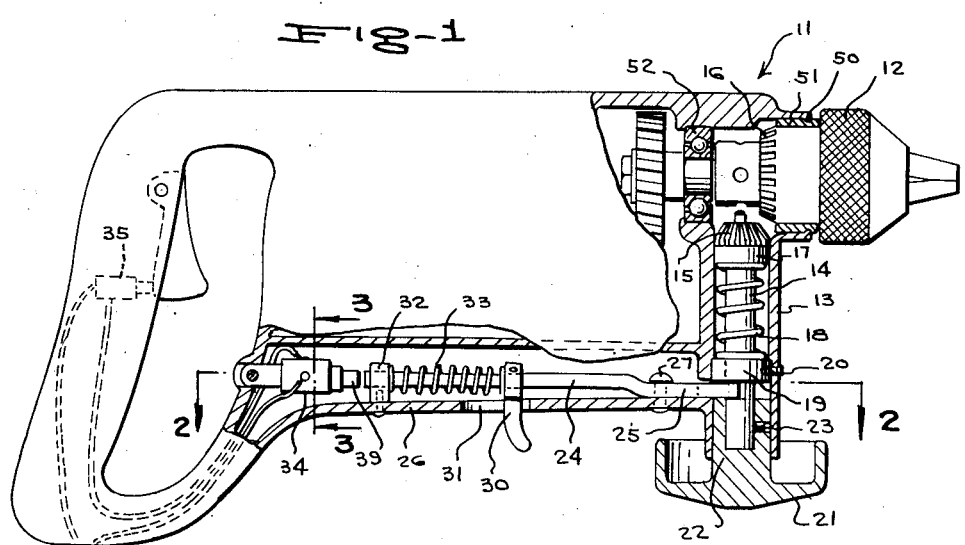
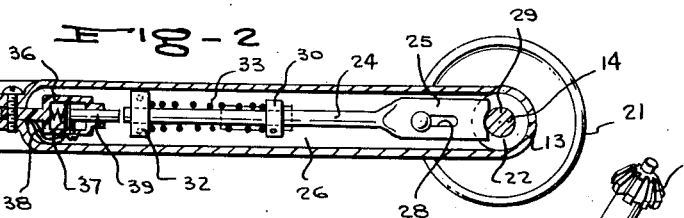
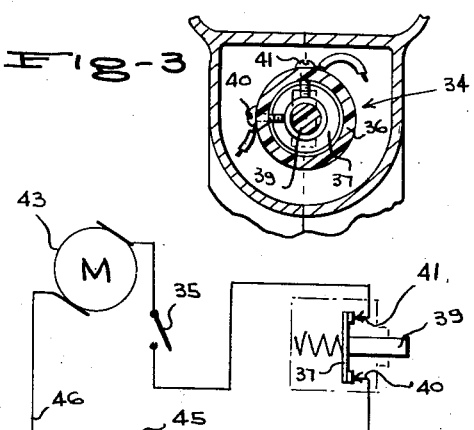
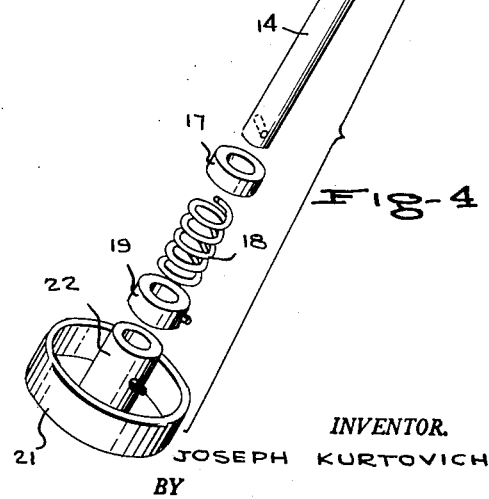
INVENTOR.
JOSEPH KURTOVICH
BY
McMorrow, Berman & Davidson
ATTORNEYS

United States Patent Office 2,807,732
Patented Sept. 24, 1957

2,807,732

ELECTRIC DRILL WITH BUILT-IN CHUCK KEY

Joseph Kurtovich, Duluth, Minn.

Application January 4, 1957, Serial No. 632,602

3 Claims. (Cl. 310—50)

This invention relates to power drills, and more particularly to an electric drill provided with a self-contained chuck key which also controls the motor of said drill.

A main object of the invention is to provide a novel and improved power drill provided with a gear chuck and an internally mounted key for operating said chuck, the drill being provided further with means controlling the motor thereof so that the motor cannot be operated when the key is engaged with the chuck.

A further object of the invention is to provide an improved power drill having a gear chuck and a self-contained key for operating same, the drill being simple in construction, being arranged so that it cannot be energized when the chuck key is engaged with the chuck, and being easy to manipulate so as to retract the chuck key from the chuck when its use is not required and to retain said key in a retracted position during normal use of the drill.

Further objects and advantages of the invention will become apparent from the following description and claims, and from the accompanying drawings, wherein:

Figure 1 is a side elevational view, partly in vertical cross section, of a power drill provided with an improved built-in chuck key according to the present invention.

Figure 2 is a fragmentary horizontal cross sectional view taken on the line 2—2 of Figure 1.

Figure 3 is an enlarged transverse vertical cross sectional detail view taken on the line 3—3 of Figure 1.

Figure 4 is a perspective view showing the chuck key with the parts thereof in separated positions, as employed in the power drill of Figures 1, 2 and 3.

Figure 5 is a circuit diagram illustrating the electrical connections of the power drill and showing the control switch which is actuated by the key retaining bar when the retaining bar is disengaged from the key.

Referring to the drawings, 11 generally designates a power drill of the type provided with a gear chuck 12 and having an internal electric motor which is drivingly coupled to said chuck in a conventional manner.

As shown in Figure 1, the housing of the power drill is formed with the supporting sleeve portion 50 in which is secured a brass bushing 51. The chuck 12 extends through and is rotatably supported in said brass bushing 51 at the intermediate portion of the chuck, as shown. The inner shank portion of the chuck is rotatably supported in a ball bearing assembly 52 mounted in the housing of the power drill.

The housing of the power drill 11 is formed with a tubular passage 13 extending perpendicular to the axis of the chuck 12, as shown in Figure 1, and containing a chuck key element 14 having at its inner end a bevel gear 15 adapted to meshingly engage with the bevel gear portion 16 of the gear chuck 12. Engaged on the shank of the key member 14 is a first washer 17 and surrounding said shank subjacent the washer 17 is a coiled spring 18. Engaged on the shank of the key member 14 is collar member 19 which is secured in the lower end portion of the tubular passage 13, as viewed in Figure 1, as by a screw 20 extending through the wall of the tubular passage 13 and threadedly engaged in the collar member 19. The coiled spring 18 bears between the collar member 19 and the collar member 17, biasing the chuck key 14 upwardly, as viewed in Figure 1, namely, in a direction urging the beveled gear 15 into meshing engagement with the beveled gear member 16 of the chuck 12.

Designated at 21 is a control knob which has a shank portion 22 extending slidably into the lower end of the passage 13 and which is secured on the lower end of the shank of the chuck key 14, as by a set screw 23.

Designated at 24 is a holding bar which has the downwardly offset end portion 25 slidably engaged with the bottom wall portion 26 of the drill housing and slidably connected thereto by a rivet 27 extending through a longitudinal slot 28 formed in the downwardly offset portion 25 and secured in an aperture in the lower wall portion 26 of the drill housing. The portion 25 is flattened and extended in width, as is clearly shown in Figure 2, and is formed at its end with an arcuate notch 29 engageable against the shank of the key 14 between the collar 19 and the top end of the knob shank 22, as viewed in Figure 1, to hold the key 14 in a retracted position against the force of the coiled spring 18.

Secured on the intermediate portion of the holding bar 24 is an outwardly projecting operating arm 30 which projects through a longitudinal slot 31 formed in the bottom wall portion 26 of the drill housing. The holding bar 24 extends slidably through a block member 32 secured to the lower wall portion 26 of the drill housing, and a coiled spring 33 surrounds the bar 24, bearing between the block 32 and the arm 30, biasing the holding bar 24 to the right, as viewed in Figure 1, namely, toward engagement with the shank of the chuck key element 14.

Designated at 34 is a switch assembly mounted in the lower portion of the drill housing in alignment with the holding bar 24. The switch assembly 34 is connected in series with the normal operating switch 35 of the electric drill, whereby the electric drill cannot be operated unless both switches 34 and 35 are closed.

The switch assembly 34 comprises a housing 36 of insulating material wherein a metal plunger member 37 is slidably mounted, said plunger member 37 being biased toward the right, as viewed in Figure 2, by a coiled spring 38 bearing between the left end wall of the housing 36 and the plunger member 37. The plunger member 37 is rigidly secured to a plunger rod element 39 of insulating material which is in axial alignment with the holding bar 24 and which extends slidably through the right end of the housing 36, as viewed in Figure 2, and terminates adjacent the end of the holding bar 24. A pair of contact studs 40 and 41, located in a common transverse vertical plane, are engaged through the wall of the switch housing 36 and are normally conductively engaged by the plunger member 37, so as to allow the electric motor of the drill, shown at 43, to be energized responsive to the closure of the normal switch 35. However, when the holding bar 24 is retracted, as by moving the arm 30 rearwardly in the slot 31, namely, to the left, as viewed in Figure 1, the end of the holding bar engages the plunger rod 39, moving the plunger element 37 away from the terminal studs 40, 41, thus opening the energizing circuit of the drill motor.

As shown in Figure 5, one of the motor energizing line wires 45 is connected to the terminal stud 40, and the other of the energizing lines wires 46 is connected to one terminal of the motor 43. The other terminal of the motor 43 is connected to the terminal stud 41 through the normal motor operating switch 35.

When it is desired to operate the gear chuck 12, the arm 24 is retracted by moving the member 30 to the left in slot 31, as viewed in Figure 1, disengaging the member 25 from between the knob shank 22 and the collar 19, releasing the key element 14 and allowing the beveled gear member 15 thereof to be moved into meshing engagement with the beveled gear member 16 of the chuck by the force of the coiled spring 18. The engagement of bar 24 with the plunger rod member 39 opens the motor circuit at the switch 34, preventing the motor from being thereafter energized until the switch 34 is again closed. However, the switch cannot close while the key is in meshing engagement with the chuck gear member 16, since the shank 22 of knob 21 is in its elevated position, preventing the bar 24 from being retracted away from the plunger rod member 39 by the action of the spring 33.

After the operation of the chuck 12 has been completed, the key is retracted therefrom by means of the knob 21, allowing the flattened end 25 of the arm 24 to slip between the collar 19 and the inner end of the knob shank 22, locking the key in its retracted position and allowing switch 34 to close. This permits normal operation of the power drill.

While a specific embodiment of an improved power drill with a built-in chuck key has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a power drill, a gear chuck, a key slidably mounted in the drill adjacent said chuck, spring means biasing said key toward driving engagement with the chuck, a holding bar slidably mounted in the drill and being lockingly engageable with the key to hold the key retracted from the chuck, a switch mounted in the drill and connected in the motor circuit of said drill, and an operating element on the switch engageable by said holding bar when the bar is disengaged from the key, said operating element being formed and arranged to open said switch responsive to the engagement of the holding bar therewith.

2. In a power drill, a gear chuck, a key slidably mounted in the drill adjacent said chuck, spring means biasing said key toward driving engagement with the chuck, a holding bar slidably mounted in the drill and being lockingly engageable with the key to hold the key retracted from the chuck, a switch mounted in the drill and connected in the motor circuit of said drill, an operating element on the switch engageable by said holding bar when the bar is disengaged from the key, said operating element being formed and arranged to open said switch responsive to the engagement of the holding bar therewith, spring means urging said holding bar toward the key, and an arm connected to said holding bar and projecting externally of the drill for retracting said holding bar from the key.

3. In a power drill, a gear chuck, a key slidably mounted in the drill adjacent said chuck, spring means biasing said key toward driving engagement with the chuck, a holding bar slidably mounted in the drill and being lockingly engageable with the key to hold the key retracted from the chuck, a switch mounted in the drill and connected in the motor circuit of said drill, an operating element on the switch engageable by said holding bar when the bar is disengaged from the key, said operating element being formed and arranged to open said switch responsive to the engagement of the holding bar therewith, spring means urging said holding bar toward the key, an arm connected to said holding bar and projecting externally of the drill for retracting said holding bar from the key, and a control knob on the end of the key located externally of the drill for retracting the key from engagement with the chuck.

No references cited.